UNITED STATES PATENT OFFICE.

WILLIAM H. HILL, OF WORCESTER, MASSACHUSETTS.

IMPROVEMENT IN PHOTOGRAPHY.

Specification forming part of Letters Patent No. 141,351, dated July 29, 1873; application filed March 7, 1873.

*To all whom it may concern:*

Be it known that I, WILLIAM HENRY HILL, of Worcester, county of Worcester, Massachusetts, have invented an Improvement in Photographic Pictures, of which the following is a specification:

The object of my invention is to produce a cheap imitation of an ivorytype or of a photographic picture on porcelain or white glass, and this object I attain by making the picture on a surface of white wax, spermaceti, or paraffine, or equivalent material, having a white backing; further objects of my invention are the preparation and fixing of the said surface.

In carrying out my invention, I prefer to make the desired surface on a thin metallic plate, in the manner described hereafter, but a backing of any white or slightly-tinted material, capable of resisting the heat to which it must be subjected in order to receive the wax surface, will serve the desired purpose. A backing of fine smoothly-calendered cardboard, or thick paper for instance, or of finely-finished linen or muslin may be sufficiently heated to melt granulated white wax, or paraffine, or spermaceti, and permit the floating of a thin film of either of these substances over the face of the backing, after which, and as soon as the coat becomes cool and hard, the surface may be sensitized in the usual manner, and the picture printed thereon from a photographic negative, the picture thus made having very much the appearance of an ivorytype or of a picture on porcelain or white glass, having a very fine granular surface, which imparts to the picture a most pleasing effect.

The backing which I prefer, however, consists of thin metal, such, for instance, as the sheet iron used in making the pictures known as ferrotypes. I first prepare the sheet by coating it with linseed-oil, or equivalent substance, and then heat the plate until the oiled surface adheres to the same in a thin, hard, smooth, Japan-like film, which cannot be removed or cracked by any ordinary bending of the plate. I then prepare a collodion of more than ordinary strength by dissolving as much gun-cotton, in equal parts of alcohol and ether, as these liquids will take up, and to this I add as much kaolin, or other equivalent white clay, or baryta, or equivalent earthy substance, as will convert the mixture into a white opaque varnish of about the consistency of cream. Having floated a film of this varnish over the surface of the oiled plate, I permit it to become hard and then float another film of collodion without kaolin over it, and, when this is dry, I pour on the plate, which should be slightly heated, molten wax, paraffine, or spermaceti, taking care that the film is very thin and uniform. After the cooling of the plate its surface may be sensitized, and the picture imparted to it from a photographic negative in the usual manner, and with the results described above.

I claim as my invention—

A photographic plate, consisting of a sheet coated with a composition of collodion and kaolin, or equivalent opaque backing, and having a surface film solely of wax or paraffine, substantially as described.

In testimony whereof I have signed my name to this specification in the presence of two subscribing witnesses.

WILLIAM H. HILL.

Witnesses:
 WM. A. STEEL,
 HUBERT HOWSON.